US012536949B2

(12) United States Patent
Lim et al.

(10) Patent No.: US 12,536,949 B2
(45) Date of Patent: Jan. 27, 2026

(54) DISPLAY DEVICE AND METHOD OF DRIVING THE SAME

(71) Applicant: SAMSUNG DISPLAY CO., LTD., Yongin-si (KR)

(72) Inventors: Sang Uk Lim, Yongin-si (KR); Hyuk Kim, Yongin-si (KR); Doo Young Lee, Yongin-si (KR); Bo Yong Chung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/199,786

(22) Filed: May 19, 2023

(65) Prior Publication Data

US 2024/0087503 A1 Mar. 14, 2024

(30) Foreign Application Priority Data

Sep. 14, 2022 (KR) ........................ 10-2022-0115800
Oct. 27, 2022 (KR) ........................ 10-2022-0140710

(51) Int. Cl.
*G09G 3/32* (2016.01)

(52) U.S. Cl.
CPC ....... *G09G 3/32* (2013.01); *G09G 2300/0842* (2013.01); *G09G 2310/0275* (2013.01); *G09G 2310/08* (2013.01)

(58) Field of Classification Search
CPC ............. G09G 3/32; G09G 2300/0842; G09G 2310/0275; G09G 2310/08
See application file for complete search history.

(56) References Cited

U.S. PATENT DOCUMENTS

| | | | | |
|---|---|---|---|---|
| 11,210,976 | B2 | 12/2021 | Kim | |
| 11,942,026 | B2 * | 3/2024 | Kim | G09G 3/32 |
| 2011/0205206 | A1 * | 8/2011 | Yoo | G09G 3/3275 345/82 |
| 2015/0279278 | A1 * | 10/2015 | Park | G09G 3/3233 345/212 |
| 2016/0372039 | A1 * | 12/2016 | Chung | G09G 3/3233 |
| 2017/0061866 | A1 * | 3/2017 | In | G09G 3/3275 |
| 2018/0012543 | A1 * | 1/2018 | Lee | G09G 3/3266 |
| 2021/0056910 | A1 * | 2/2021 | Chung | G11C 19/28 |
| 2022/0157215 | A1 * | 5/2022 | Park | G09G 3/3266 |
| 2022/0351680 | A1 * | 11/2022 | Choi | G09G 3/3233 |

FOREIGN PATENT DOCUMENTS

| | | | |
|---|---|---|---|
| KR | 1020210009899 | A | 1/2021 |
| KR | 102405106 | B1 | 6/2022 |

* cited by examiner

*Primary Examiner* — Ariel A Balaoing
(74) *Attorney, Agent, or Firm* — CANTOR COLBURN LLP

(57) ABSTRACT

A display device includes pixels each including a driving transistor and a light-emitting element, a sensing unit which generates a digital data by receiving a sensing voltage corresponding to a characteristic of a driving transistor from a predetermined pixel among the pixels during a sensing period, and generates sensing data using the digital data, and a timing controller which receives input data from an outside, corrects the input data using the sensing data and generates output data, and the sensing unit generates one sensing data using two or more digital data corresponding to the predetermined pixel.

13 Claims, 9 Drawing Sheets

<THRESHOLD VOLTAGE SENSING PERIOD>

DISPLAY DEVICE AND METHOD OF DRIVING THE SAME

This application claims priority to Korean Patent Application No. 10-2022-0115800, filed on Sep. 14, 2022, and Korean Patent Application No. 10-2022-0140710, filed on Oct. 27, 2022, and all the benefits accruing therefrom under 35 U.S.C. § 119, the content of which in their entirety is herein incorporated by reference.

BACKGROUND

1. Field

The disclosure relates to a display device and a method of driving the same.

2. Description of the Related Art

As information technology is developed, importance of a display device, which is a connection medium between a user and information, is being highlighted. In response to this, a use of a display device such as a liquid crystal display device and an organic light-emitting display device is increasing.

The display device displays an image using a plurality of pixels. Each of the pixels includes a driving transistor and a light-emitting element, a predetermined current is supplied from the driving transistor to the light-emitting element, and the light-emitting element emits light with a predetermined luminance corresponding to a current amount supplied thereto.

A characteristic (e.g., a threshold voltage and/or mobility) of the driving transistor may be set differently for each pixel due to a process deviation. In addition, the characteristic of the driving transistor may be set differently according to a use time. In order to compensate for this, an external compensation method of sensing the characteristic of the driving transistor and compensating for data in response to a sensing result is used.

SUMMARY

A feature of the disclosure is to provide a display device and a method of driving the same capable of improving accuracy of sensing by minimizing a sensing deviation in an external compensation method.

In an embodiment of the disclosure, a display device includes pixels each including a driving transistor and a light-emitting element, a sensing unit which generates a digital data by receiving a sensing voltage corresponding to a characteristic of a driving transistor from a predetermined pixel among the pixels during a sensing period, and generate sensing data using the digital data, and a timing controller which receives input data from an outside, corrects the input data using the sensing data and generates output data, and the sensing unit generates one sensing data using two or more digital data corresponding to the predetermined pixel.

In an embodiment, the sensing unit may generate an average value of the two or more digital data as the sensing data.

In an embodiment, the sensing unit may generate an intermediate value of the two or more digital data as the sensing data.

In an embodiment, the sensing unit may generate one digital data corresponding to the predetermined pixel during the sensing period.

In an embodiment, the sensing unit may generate the two or more digital data corresponding to the predetermined pixel during the sensing period.

In an embodiment, the sensing unit may generate the two or more digital data while sensing the sensing voltage corresponding to the predetermined pixel at different time points.

In an embodiment, the sensing unit may include a storage which stores the digital data, a controller which controls the storage, and a generator which generates the sensing data using the two or more digital data corresponding to the predetermined pixel.

In an embodiment, the controller may supply the two or more digital data to the generator when the two or more digital data corresponding to the predetermined pixel are stored in the storage.

In an embodiment, the display device may further include a data driver which generates a data signal using the output data and supplies the data signal to the predetermined pixel.

In an embodiment of the disclosure, a method of driving a display device includes receiving a sensing voltage from a driving transistor included in a predetermined pixel during a sensing period, converting the sensing voltage of the predetermined pixel into digital data, generating sensing data using two or more digital data in a sensing unit after the two or more digital data are supplied from the predetermined pixel, and generating output data by correcting input data input from an outside using the sensing data.

In an embodiment, the sensing unit may generate an average value of the two or more digital data as the sensing data.

In an embodiment, the sensing unit may generate an intermediate value of the two or more digital data as the sensing data.

In an embodiment, one digital data may be generated in correspondence with the predetermined pixel during the sensing period.

In an embodiment, the two or more digital data may be generated in correspondence with the predetermined pixel during the sensing period.

In an embodiment, the two or more digital data may be generated while sensing the sensing voltage of the predetermined pixel at different time points.

In an embodiment, the method may further include storing the digital data.

In an embodiment, the method may further include generating a data signal using the output data, and supplying the data signal to the predetermined pixel.

Features of the disclosure are not limited to the features described above, and other technical features which are not described will be clearly understood by those skilled in the art from the following description.

In accordance with the display device and the method of driving the same in embodiments of the disclosure, one sensing data may be generated using a plurality of digital data sensed from the same pixel, and thus a sensing deviation may be minimized.

In addition, in accordance with the display device and the method of driving the same in embodiments of the disclosure, the sensing data may be generated using the average value or the intermediate value of the plurality of digital data, and thus a ripple influence of first power may be minimized.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
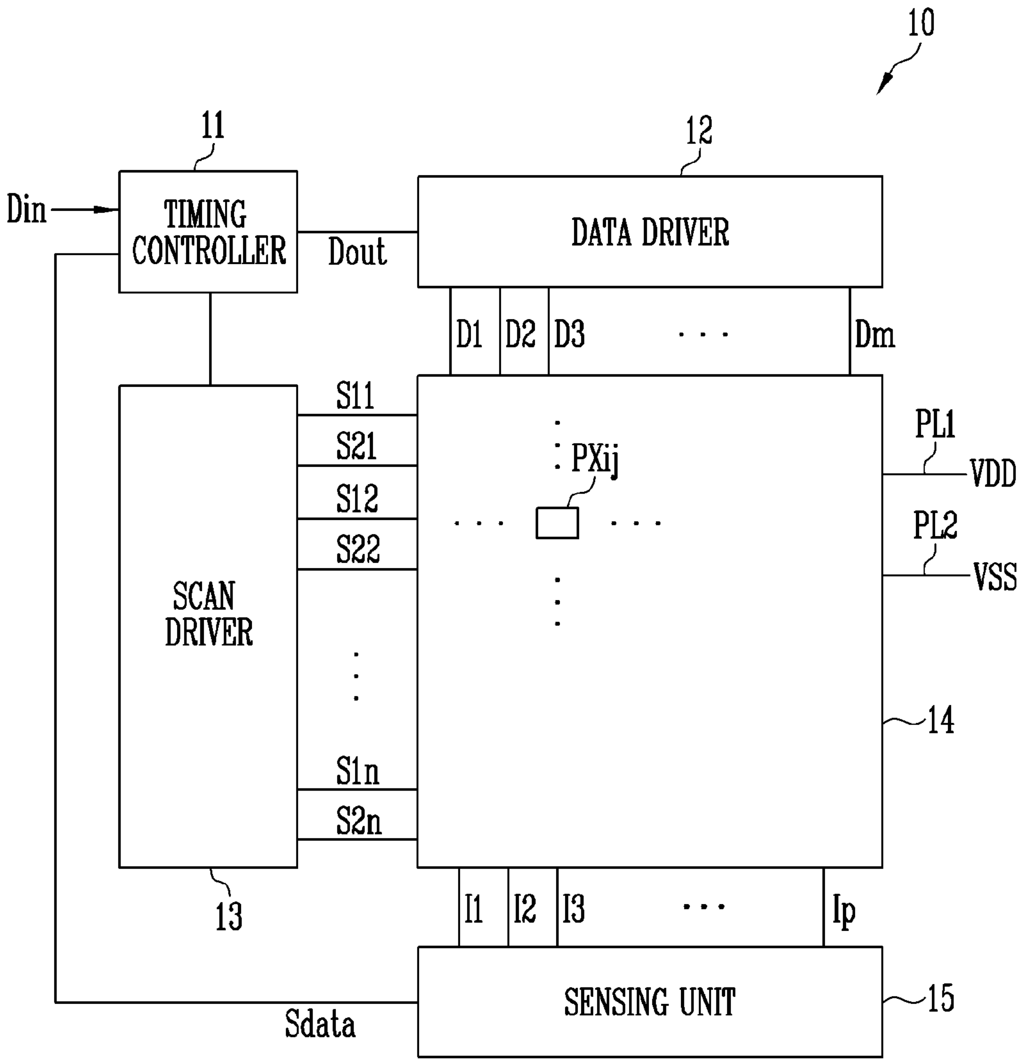
FIG. 1 is a diagram illustrating an embodiment of a display device according to the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

The term "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

FIG. 1 is a diagram illustrating an embodiment of a display device according to the disclosure.

Referring to FIG. 1, the display device 10 in an embodiment of the disclosure includes a timing controller 11, a data driver 12, a scan driver 13, a pixel unit 14, and a sensing unit 15.

The timing controller 11 may receive input data Din and control signals corresponding to each frame from an external processor. Here, the processor may include at least one of a graphics processing unit ("GPU"), a central processing unit ("CPU"), an application processor ("AP"), or the like.

The timing controller 11 generates output data Dout by correcting the input data Din, and supplies the output data Dout to the data driver 12. Here, the timing controller 11 may receive sensing data Sdata from the sensing unit 15 and correct the output data Dout using the sensing data Sdata. The sensing data Sdata may include characteristic information (e.g., threshold voltage and/or mobility information) of a driving transistor included in each of pixels (e.g., PXij), and the timing controller 11 may generate the output data Dout by correcting the input data Din so that a characteristic of the driving transistor included in each of the pixels is compensated by the sensing data Sdata.

In an embodiment, the timing controller 11 may correct the input data Din so that deterioration of a light-emitting element included in each of the pixels is compensated. In addition, the timing controller 11 may correct the input data Din by reflecting a light measurement result measured in a process. In addition, the timing controller 11 may provide control signals suitable for specifications of each of the data driver 12, the scan driver 13, and the sensing unit 15.

During a display period, the data driver 12 may generate a data signal (or a data voltage) to be supplied to data lines D1 to Dm (here, "m" is a natural number) in response to the output data Dout and the control signals supplied from the timing controller 11. The data driver 12 may supply the data signal to the data lines D1 to Dm in a pixel row (or horizontal line) unit. Here, the pixel row may mean a position of pixels connected to the same scan line.

In an embodiment, the data signal supplied to the data lines D1 to Dm may be supplied to pixels selected by a first scan signal, for example. To this end, the data driver 12 may supply the data signal to the data lines D1 to Dm to be synchronized with the first scan signal.

During a sensing period, the data driver 12 may supply a voltage of reference power to the data lines D1 to Dm. Here, the voltage of the reference power may be set to a voltage at which the driving transistor included in each of the pixels may be turned on.

The scan driver 13 may supply the first scan signal to first scan lines S11 to S1n (here, "n" is a natural number) and supply a second scan signal to second scan lines S21 to S2n in response to the control signals from the timing controller 11.

In an embodiment, the scan driver 13 may sequentially supply a first scan signal having a gate-on voltage (or a turn-on level) to the first scan lines S11 to S1n, for example. In addition, the scan driver 13 may sequentially supply a second scan signal having a gate-on voltage (or a turn-on level) to the second scan lines S21 to S2n. In FIG. 1, one scan driver 13 drives the first scan lines S11 to S1n and the second scan lines S21 to S2n, but the disclosure is not limited thereto. In an embodiment, each of the first scan lines S11 to S1n and the second scan lines S21 to S2n may receive scan signals from different scan drivers, for example.

During the display period, when the first scan signal and the second scan signal are sequentially supplied, the pixels are selected in the pixel row unit. The pixels selected during the display period may receive the data signal, and may generate light of a predetermined luminance in response to the data signal.

During the sensing period, when the first scan signal and the second scan signal are sequentially supplied, the pixels are selected in the pixel row unit. The sensing unit 15 may supply a voltage of initialization power to sensing lines I1 to Ip (here, "p" is a natural number) during the sensing period, or receive a sensing voltage (or sensing information) from pixels connected to the sensing lines I1 to Ip (that is, pixels selected by the first scan signal and the second scan signal).

The sensing voltage may include the characteristic information of the driving transistor. The sensing voltage may include mobility information of the driving transistor. Deterioration amount information of the light-emitting element may be sensed in the sensing voltage. The sensing unit 15 may receive the sensing voltage from the pixels and generate the sensing data Sdata using the sensing voltage. The sensing data Sdata may be supplied to the timing controller 11.

During the display period, the sensing unit 15 may supply the voltage of the initialization power to the sensing lines I1 to Ip. During the sensing period, the sensing unit 15 may supply the voltage of the initialization power to the sensing lines I1 to Ip during a partial period, and receive the sensing information from the pixels connected to the sensing lines I1 to Ip during a remaining period.

The pixel unit 14 includes the pixels. Each of the pixels may be connected to a first power line PL1 and a second power line PL2. The pixels may receive first power VDD through the first power line PL1 and receive second power VSS through the second power line PL2. The first power VDD may be set to a voltage level higher than that of the second power VSS.

The first power line PL1 may be commonly connected to the pixels, and may supply the first power VDD to the pixels. The second power line PL2 may be commonly connected to the pixels and may supply the second power VSS to the pixels. However, a connection relationship between the power lines PL1 and PL2 and the pixels is not limited thereto. In an embodiment, a plurality of first power lines PL1 may be connected to different pixels, for example. In another embodiment, a plurality of second power lines PL2 may be connected to different pixels.

Each of the pixels may include a plurality of transistors and at least one light-emitting element. The pixels may be selected when a scan signal is supplied to a scan line connected thereto to receive the data signal from a data line. Each of the pixels supplied with the data signal may externally supply light of a predetermined luminance in response to the data signal.

Figure 2:
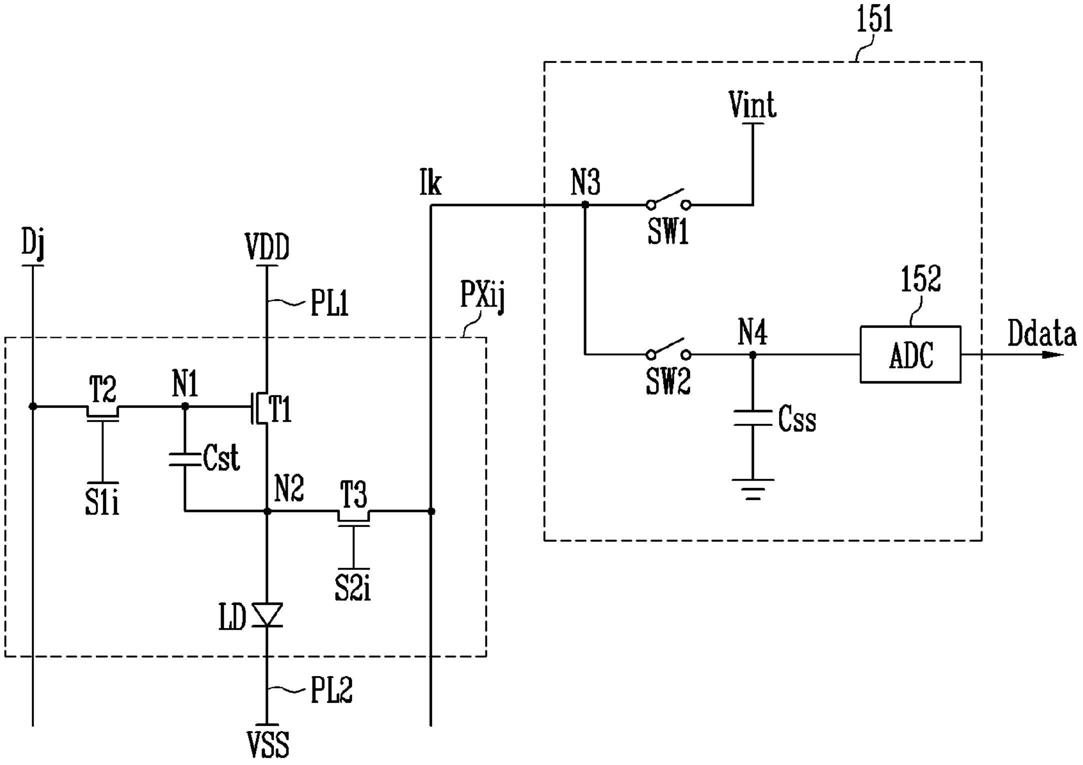
FIG. 2 is a diagram illustrating an embodiment of a pixel and a sensing channel according to the disclosure.

FIG. 2 is a diagram illustrating an embodiment of a pixel and a sensing channel according to the disclosure. In FIG. 2, a pixel disposed on an i-th horizontal line and a j-th vertical line is shown (here, "I" and "j" are natural numbers).

Referring to FIG. 2, the pixel PXij in an embodiment of the disclosure may include transistors T1 to T3, a storage capacitor Cst, and a light-emitting element LD.

The light-emitting element LD may be connected between the first power line PL1 to which the first power VDD is supplied and the second power line PL2 to which the second power VSS is supplied. In an embodiment, a first electrode (e.g., an anode electrode) of the light-emitting element LD may be connected to the first power line PL1 via a second node N2 and the first transistor T1, and a second electrode (e.g., a cathode electrode) may be connected to the second power line PL2. The light-emitting element LD may emit light with a luminance corresponding to a current amount supplied from the first transistor T1.

A voltage of the first power VDD and a voltage of the second power VSS may have a predetermined potential difference so that the light-emitting element LD emits light. In an embodiment, the first power VDD may be relatively high potential power having a high voltage, and the second power VSS may be relatively low potential power having a voltage lower than that of the first power VDD.

The light-emitting element LD may be selected as an organic light-emitting diode. In addition, the light-emitting element LD may be selected as an inorganic light-emitting diode such as a micro light-emitting diode ("LED") or a quantum dot light-emitting diode. In addition, the light-emitting element LD may be an element in which an organic material and an inorganic material are combined. In FIG. 2, the pixel includes a single light-emitting element LD, but in another embodiment, the pixel may include a plurality of light-emitting elements, and the plurality of light-emitting elements may be connected in series, in parallel, or in series-parallel with each other.

The transistors T1, T2, and T3 may be configured as N-type transistors. In another embodiment, the transistors T1, T2, and T3 may be configured as P-type transistors. In another embodiment, the transistors T1, T2, and T3 may be configured as a combination of an N-type transistor and a P-type transistor. The transistor may be configured in various forms, such as a thin film transistor ("TFT"), a field effect transistor ("FET"), and a bipolar junction transistor ("BJT").

The first transistor T1 is connected between the first power line PL1 and the second node N2. In addition, a gate electrode of the first transistor T1 is connected to a first node N1. The first transistor T1 controls a current amount supplied from the first power VDD to the second power VSS via the light-emitting element LD in correspondence with a voltage of the first node N1. Such a first transistor T1 may be also referred to as a driving transistor.

The second transistor T2 is connected between the data line Dj and the first node N1. In addition, a gate electrode of the second transistor T2 is connected to a first scan line S1*i*. The second transistor T2 is turned on when a first scan signal is supplied to the first scan line S1*i* to electrically connect the data line Dj and the first node N1. Such a second transistor T2 may be also referred to as a switching transistor.

The third transistor T3 is connected between the second node N2 and a sensing line Ik (here, "k" is a natural number). In addition, a gate electrode of the third transistor T3 is connected to a second scan line S2*i*. Such a third transistor T3 is turned on when a second scan signal is supplied to the second scan line S2*i* to electrically connect the sensing line Ik and the second node N2. Such a third transistor T3 may be also referred to as a sensing transistor.

The storage capacitor Cst is connected between the first node N1 and the second node N2. The storage capacitor Cst stores a voltage corresponding to a difference between the first node N1 and the second node N2.

A sensing channel 151 may include a first switch SW1, a second switch SW2, a sensing capacitor Css, and an analog-to-digital converter (hereinafter referred to as "ADC") 152.

The first switch SW1 may be connected between the initialization power Vint and a third node N3 connected to the sensing line Ik. The first switch SW1 may be turned on or off in response to a control signal supplied from the timing controller 11 to the sensing unit 15. When the first switch SW1 is turned on, the voltage of the initialization power Vint may be supplied to the sensing line Ik via the third node N3.

The second switch SW2 may be connected between the third node N3 and a fourth node N4. The second switch SW2 may be turned on or off in response to the control signal supplied from the timing controller 11 to the sensing unit 15. When the second switch SW2 is turned on, the third node N3 and the fourth node N4 are electrically connected.

The sensing capacitor Css may include a second electrode connected to the fourth node N4 and a first electrode connected to base power (e.g., ground of 0 volt (V)). The sensing capacitor Css may store a voltage of the fourth node N4.

The ADC 152 may be connected to the fourth node N4. The ADC 152 may convert a voltage (e.g., the sensing voltage) applied to the fourth node N4 into digital data Ddata and supply the digital data to a sensing data generator 154 (refer to FIG. 6). Here, the digital data Ddata supplied from the ADC 152 to the sensing data generator 154 may be the sensing information and may include the characteristic (threshold voltage and/or mobility) information of the driving transistor.

In an embodiment, one ADC 152 may be disposed per one sensing channel 151. In this case, the sensing unit 15 may include ADCs 152 respectively corresponding to the number of sensing channels 151. In another embodiment, the ADC 152 may be disposed to share a plurality of sensing channels 151. In this case, the ADC 152 may perform time division and convert the sensing voltage of the plurality of sensing channels 151.

Figure 3:
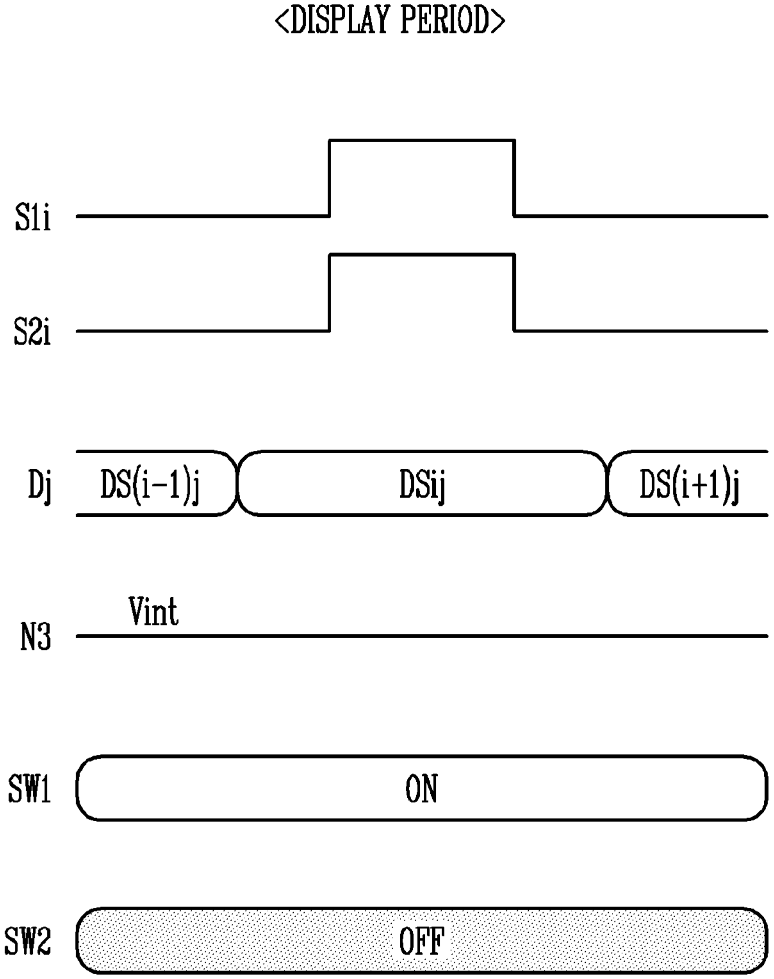
FIG. 3 is a diagram illustrating an embodiment of a display period according to the disclosure.

FIG. 3 is a diagram illustrating an embodiment of a display period according to the disclosure.

Referring to FIGS. 2 and 3, during the display period, the sensing line Ik, that is, the third node N3, receives the voltage of the initialization power Vint. To this end, during the display period, the first switch SW1 may be set to a turn-on state, and the second switch SW2 may be set to a turn-off state.

During the display period, data signals DS(i−1)j, DSij, and DS(i+1)j may be sequentially supplied to the data line Dj in the pixel row unit. The first scan signal may be supplied to the first scan line S1*i* from a corresponding pixel row, and the second scan signal may be supplied to the second scan line S2*i*.

When the first scan signal is supplied to the first scan line S1*i*, the second transistor T2 is turned on. When the second transistor T2 is turned on, the data signal DSij from the data line Dj is supplied to the first node N1. When the second scan signal is supplied to the second scan line S2*i*, the third transistor T3 is turned on. When the third transistor T3 is turned on, the voltage of the initialization power Vint is supplied to the second node N2 via the first switch SW1, the third node N3, the sensing line Ik, and the third transistor T3. At this time, a voltage corresponding to a voltage difference between the first node N1 and the second node N2 is stored in the storage capacitor Cst. Here, the initialization power Vint supplied to the second node N2 is set to a constant voltage maintaining a constant voltage, and thus the voltage stored in the storage capacitor Cst may be determined by a voltage of the data signal DSij.

After the voltage corresponding to the data signal DSij is stored in the storage capacitor Cst, the supply of the first scan signal to the first scan line S1*i* is stopped, the second transistor T2 is turned off, the supply of the second scan signal to the second scan line S2*i* is stopped, and the third transistor T3 is turned off. Thereafter, the first transistor T1 may supply a current corresponding to the voltage stored in the storage capacitor Cst to the light-emitting element LD, and the light-emitting element LD may emit light of a predetermined luminance in response to a current amount supplied thereto.

Figure 4:
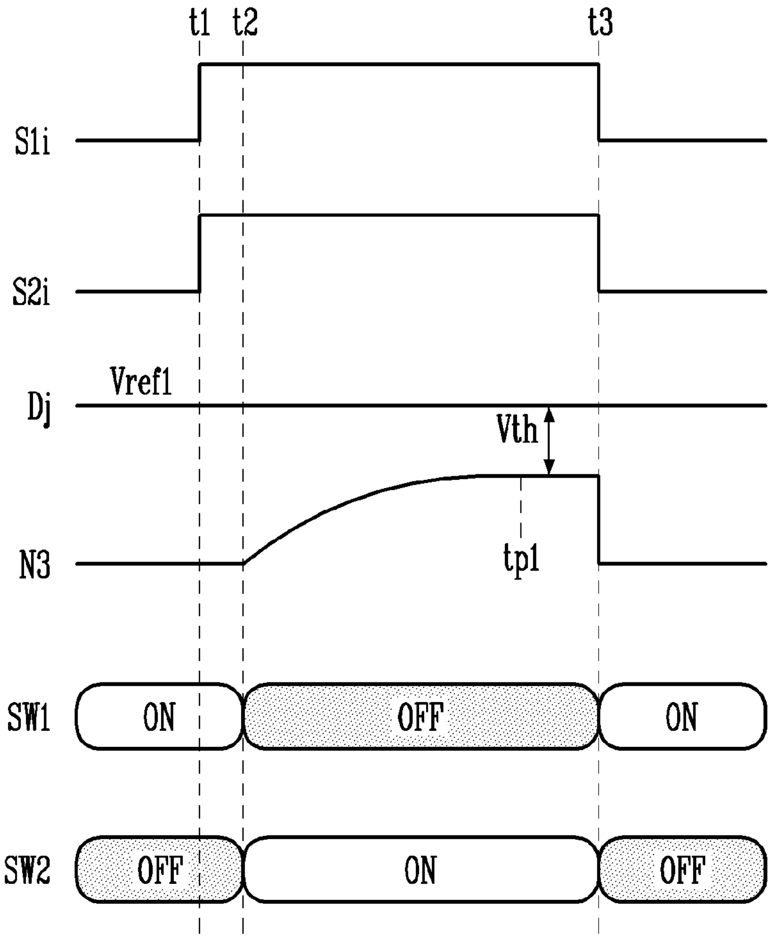
FIG. 4 is a diagram illustrating an embodiment of a sensing period according to the disclosure.

FIG. 4 is a diagram illustrating an embodiment of a sensing period according to the disclosure. FIG. 4 illustrate a period for sensing the threshold voltage of the driving transistor (that is, the first transistor T1).

Referring to FIG. 4, a voltage of first reference power Vref1 may be supplied to the data line Dj during a threshold voltage sensing period. Here, the first reference power Vref1 is set so that the first transistor T1 included in each of the pixels (e.g., PXij in FIGS. 1 and 2) is turned on.

During a period between a first time point t1 and a third time point t3, the first scan signal is supplied to the first scan line S1*i* and the second scan signal is supplied to the second scan line S2*i*.

The second transistor T2 is turned on during the period between the first time point t1 and the third time point t3 when the first scan signal is supplied to the first scan line S1*i*. When the second transistor T2 is turned on, the data line Dj and the first node N1 are electrically connected. In this case, the voltage of the first reference power Vref1 from the data line Dj is supplied to the first node N1.

The third transistor T3 is turned on during the period between the first time point t1 and the third time point t3 when the second scan signal is supplied to the second scan line S2*i*. When the third transistor T3 is turned on, the second node N2 and the sensing line Ik (or the third node N3) are electrically connected.

At the first time point t1, the first switch SW1 is turned on, and the second switch SW2 maintains a turn-off state. When the first switch SW1 is turned on, the voltage of the initialization power Vint is supplied to the second node N2 via the third node N3, the sensing line Ik, and the third transistor T3. Then, a voltage corresponding to a voltage difference between the first reference power Vref1 and the initialization power Vint is stored in the storage capacitor Cst. Here, the voltage of the initialization power Vint may be set so that the light-emitting element LD is turned off.

At the second time point t2, the first switch SW1 is turned off, and the second switch SW2 is turned on. When the second switch SW2 is turned on, the third node N3 and the fourth node N4 are electrically connected. When the first switch SW1 is turned off, the voltage of the initialization power Vint is not supplied to the third node N3 (or the sensing line Ik).

After the second time point t2, voltages of the second node N2 and the third node N3 may increase to a voltage obtained by subtracting the threshold voltage of the first transistor T1 from the voltage of the first reference power Vref1 in correspondence with the current amount supplied from the first transistor T1. After the voltage of the second node N2 is increased to the voltage obtained by subtracting the threshold voltage of the first transistor T1 from the voltage of the first reference power Vref1, the first transistor T1 is turned off, and thus the voltages of the second node N2 and the third node N3 do not increase any more. After the first transistor T1 is turned off, the voltage (that is, Vref1−Vth(T1)) applied to the second node N2 and the third node N3 may be the above-described sensing voltage. Since the fourth node N4 is connected to the third node N3 via the second switch SW2 in a turn-on state, the sensing voltage is stored in the sensing capacitor Css.

After the sensing voltage is stored in the sensing capacitor Css, the ADC 152 may change the sensing voltage to the digital data Ddata and supplies the digital data Ddata to the sensing data generator 154 (refer to FIG. 6) at a first sensing time tp1. Here, the digital data Ddata supplied from the ADC 152 to the sensing data generator 154 may include threshold voltage information of the driving transistor.

At the third time point t3, the supply of the second scan signal to the second scan line S2*i* is stopped. When the supply of the second scan signal to the second scan line S2*i* is stopped, the third transistor T3 is turned off. In addition, at the third time point t3, the first switch SW1 may be turned on, and the second switch SW2 may be turned off.

When the first switch SW1 is turned on, the voltage of the initialization power Vint may be supplied to the sensing line Ik, and thus the sensing line Ik may be initialized with the voltage of the initialization power Vint.

During the sensing period, the ADC 152 changes the sensing voltage applied to the fourth node N4, that is, the voltage obtained by subtracting the threshold voltage of the first transistor T1 from the first reference power Vref1, into the digital data Ddata. Therefore, sensing accuracy may be improved only when the sensing voltage is maintained at a constant voltage.

In the disclosure, a waveform supplied during the sensing period is not limited to FIG. 4. In an embodiment, various methods may be applied to the waveform supplied during the sensing period, for example.

Additionally, in FIG. 4, the first switch SW1 and the second switch SW2 are simultaneously turned on or off at the second time point t2, but the disclosure is not limited thereto. In an embodiment, turn-on periods of the first switch SW1 and the second switch SW2 may partially overlap based on the second time point t2. Then, the sensing capacitor Css may be initialized by the voltage of the initialization power Vint.

Figure 5A:
FIGS. 5A and 5B are diagrams illustrating a ripple of first power.
Figure 5B:
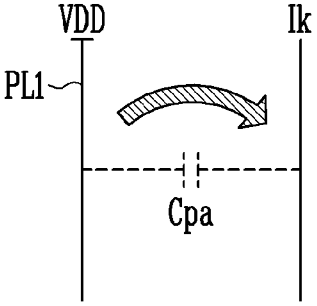

FIGS. 5A and 5B are diagrams illustrating a ripple of the first power.

Referring to FIGS. 5A and 5B, in general, the first power VDD supplied to the pixels (e.g., PXij in FIGS. 1 and 2) is generated using a direct current to direct current ("DC-DC") converter. The DC-DC converter generates the voltage of the first power VDD in response to turn-on and turn-off operations of a plurality of switches, and thus a ripple occurs in correspondence with turn-on and turn-off frequencies of the plurality of switches.

The ripple of the first power VDD may appear to repeat a voltage higher than a constant voltage and a voltage lower than the constant voltage based on the constant voltage (indicated by a dotted line in FIG. 5B). The ripple of the first power VDD may be transferred to the sensing line Ik by a parasitic capacitor Cpa between the sensing line Ik and the first power line PL1. In this case, a voltage value of the sensing voltage may be changed by the ripple of the first power VDD, and thus reliability of compensation may be reduced.

In order to prevent this, a method of increasing a switching frequency of the DC-DC converter may be applied. When the switching frequency of the DC-DC converter is increased, the ripple of the first power VDD may be minimized, and thus a change degree of the sensing voltage may be minimized. However, when the switching frequency of the DC-DC converter is increased, power consumption may be increased. Therefore, in an embodiment of the disclosure, a method capable of increasing the switching frequency of the DC-DC converter and minimizing a sensing deviation is proposed.

Figure 6:
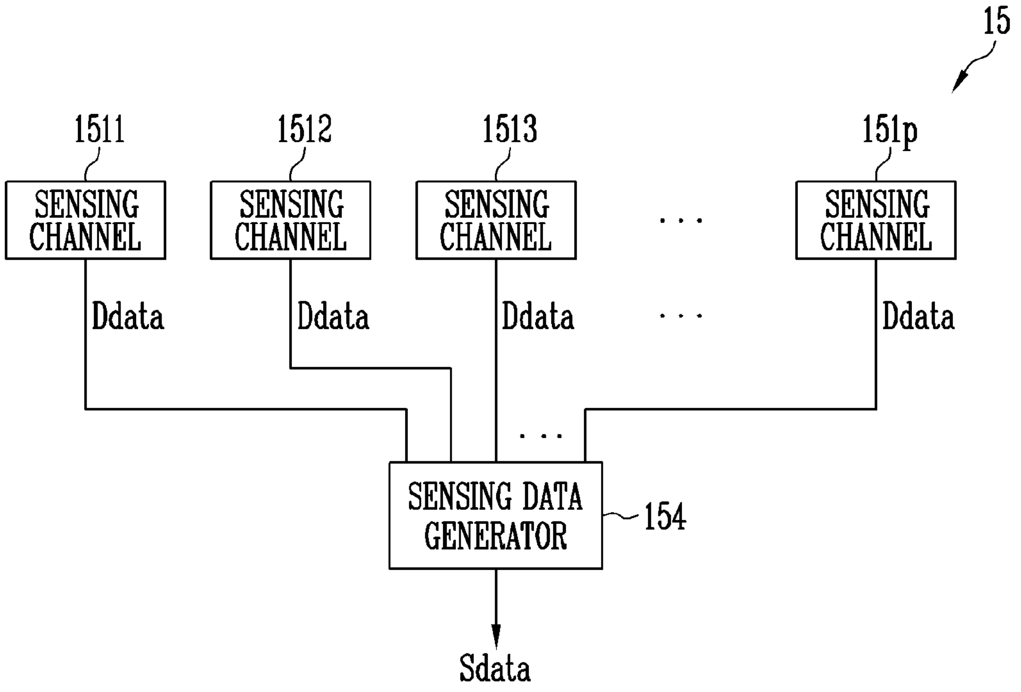
FIG. 6 is a diagram illustrating an embodiment of a sensing unit according to the disclosure.

FIG. 6 is a diagram illustrating an embodiment of a sensing unit according to the disclosure. In FIG. 6, the sensing channel means the sensing channel shown in FIG. 2, and an overlapping description in relation to this is omitted.

Referring to FIG. 6, the sensing unit 15 in an embodiment of the disclosure includes sensing channels 1511 to 151*p* and the sensing data generator 154 (here, "p" is a natural number equal to or greater than 2).

The sensing channels 1511 to 151*p* may be connected to each of the pixels (e.g., PXij in FIGS. 1 and 2) as described with reference to FIG. 2, may convert the sensing voltage supplied from the pixels into the digital data Ddata, and may supply the digital data Ddata to the sensing data generator 154 during the sensing period.

The sensing data generator 154 may temporarily store the digital data Ddata, and generate the sensing data Sdata using the stored digital data Ddata. In an embodiment, the sensing data generator 154 may generate the sensing data Sdata using two or more digital data Ddata in correspondence with the same pixel.

In an embodiment, the sensing data generator 154 may generate the sensing data Sdata by averaging the two or more digital data Ddata in correspondence with the same pixel. When the sensing data Sdata is generated by averaging the two or more digital data Ddata, as shown in Table 1, an influence of the ripple of the first power VDD may be minimized, and thus the reliability of the compensation may be secured.

TABLE 1

| Number of times of sensing | Once | Five times |
|---|---|---|
| Max | 2.3 | 1.6 |
| AVG | 1.8 | 1.3 |

Table 1 shows just noticeable difference ("JND") corresponding to a luminance of the pixel unit 14. Here, the JND means a difference of a physical stimulus that causes a minimal sense difference. That is, the JND may mean a difference of a luminance through which a person may recognize an afterimage. Referring to Table 1, when the sensing data Sdata is generated after sensing a pixel once, and an image is displayed on the pixel unit 14 using the sensing data Sdata, a maximum value (Max) of the JND represents 2.3, and an average value (AVG) represents 1.8.

When the sensing data Sdata is generated by averaging five digital data Ddata after sensing the pixel five times, and an image is displayed on the pixel unit 14 using the sensing data Sdata, the maximum value (Max) of the JND represents 1.6, and the average value (AVG) represents 1.3. That is, when the sensing data Sdata is generated by averaging two or more digital data Ddata as in the embodiment of the disclosure, the characteristic of the first transistor T1 may be more accurately compensated.

In the above description, the sensing data Sdata is generated by averaging the two or more digital data, but the disclosure is not limited thereto.

In an embodiment, the sensing data generator 154 may receive two or more digital data Ddata in correspondence with the same pixel, and generate an intermediate value between the highest value and the lowest value of the two or more digital data Ddata as the sensing data Sdata. As described above, when the intermediate value of the two or more digital data Ddata is generated as the sensing data Sdata, an influence of the ripple of the first power VDD may be minimized, and thus the reliability of the compensation may be secured.

Figure 7:
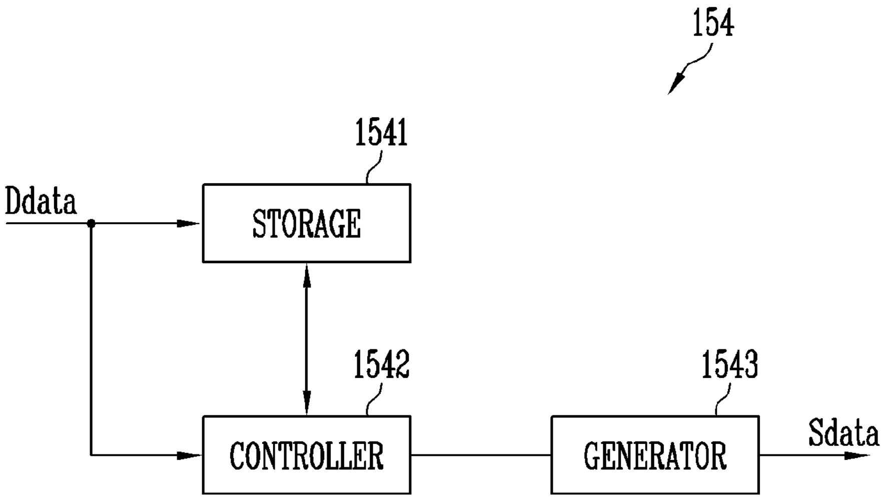
FIG. 7 is a diagram illustrating an embodiment of a sensing data generator shown in FIG. 6.

FIG. 7 is a diagram illustrating an embodiment of the sensing data generator shown in FIG. 6.

Referring to FIG. 7, the sensing data generator 154 may include a storage 1541, a controller 1542, and a generator 1543.

The storage 1541 may store the digital data Ddata supplied from the sensing channels 1511 to 151*p* (refer to FIG. 6) in response to control of the controller 1542. In an embodiment, the storage 1541 may store the digital data Ddata for each pixel in response to the control of the controller 1542, for example.

The controller 1542 may control the storage 1541 to store the digital data Ddata for each pixel. In addition, when the two or more digital data Ddata are stored in correspondence with the same pixel, the controller 1542 may supply the two or more digital data Ddata to the generator 1543.

In an embodiment, the generator 1543 may generate the sensing data Sdata by averaging the two or more digital data Ddata supplied from the controller 1542. In an embodiment, the generator 1543 may generate the intermediate value of the two or more digital data Ddata as the sensing data Sdata.

Figure 8:
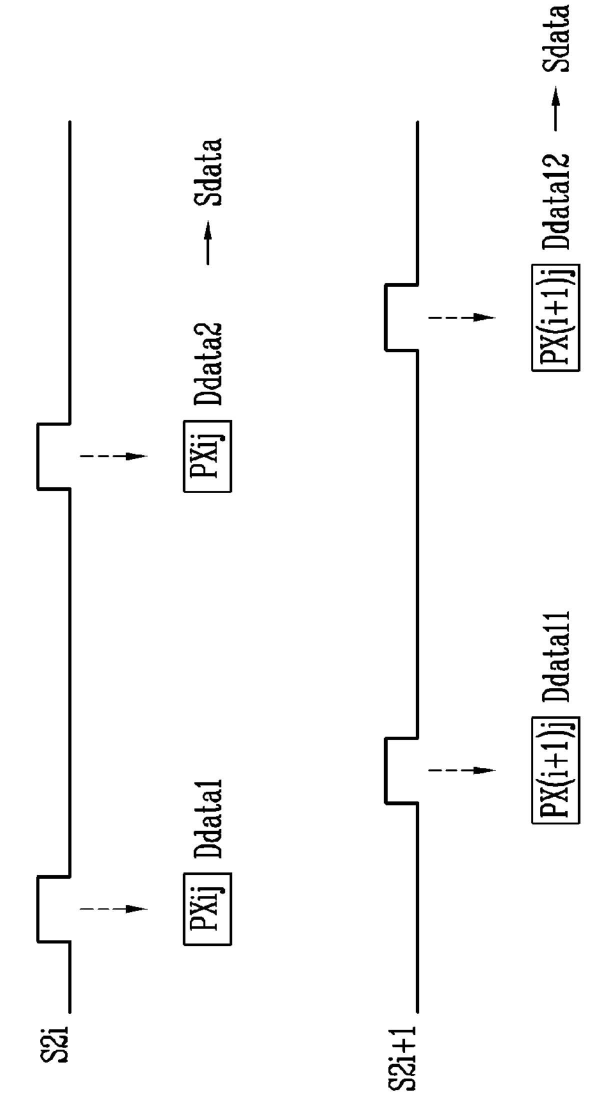
FIG. 8 is a diagram illustrating a process in which sensing data is generated.

FIG. 8 is a diagram illustrating a process in which the sensing data is generated. Since the waveform supplied during the sensing period is described with reference to FIG. 4, the waveform is briefly shown in FIG. 8. In addition, for convenience of description, in FIG. 8, the sensing data is generated using two digital data.

Referring to FIG. 8, during a first sensing period, the second scan signal is supplied to the second scan line S2*i*, and the ADC 152 generates digital data Ddata1 in response to the second signal. The digital data Ddata1 generated by the ADC 152 may be stored in the storage 1541 under the control of the controller 1542.

Thereafter, during a second sensing period, the second scan signal is supplied to the second scan line S2*i*, and the ADC 152 generates digital data Ddata2 in response to the second signal. The digital data Ddata2 generated by the ADC 152 may be stored in the storage 1541 under the control of the controller 1542.

After the two digital data Ddata1 and Ddata2 are stored in the storage 1541 in correspondence with the same pixel, the controller 1542 supplies the two digital data Ddata1 and Ddata2 corresponding to the same pixel to the generator 1543. The generator 1543 generates an average or an intermediate value of the two digital data Ddata1 and Ddata2 as the sensing data Sdata, and supplies the generated sensing data Sdata to the timing controller 11.

The timing controller 11 generates the output data Dout by correcting the input data Din using the sensing data Sdata. The output data Dout generated by the timing controller 11 is supplied to the data driver 12.

The data driver 12 generates the data signal using the output data Dout and supplies the generated data signal to the pixels (e.g., PXij in FIGS. 1 and 2). Here, the data signal is generated by the output data Dout corrected by the sensing data Sdata, thereby compensating for the characteristic of the first transistor T1 included in the pixels.

Similarly, in a third sensing period, digital data Ddata11 is generated by the ADC 152 in response to the second scan signal supplied to a second scan line S2*i*+1. In addition, in a fourth sensing period, digital data Ddata12 is generated by the ADC 152 in response to the second scan signal supplied to the second scan line S2*i*+1. Thereafter, the generator 1543 generates the sensing data Sdata using the digital data Ddata11 and Ddata12.

Figure 9:
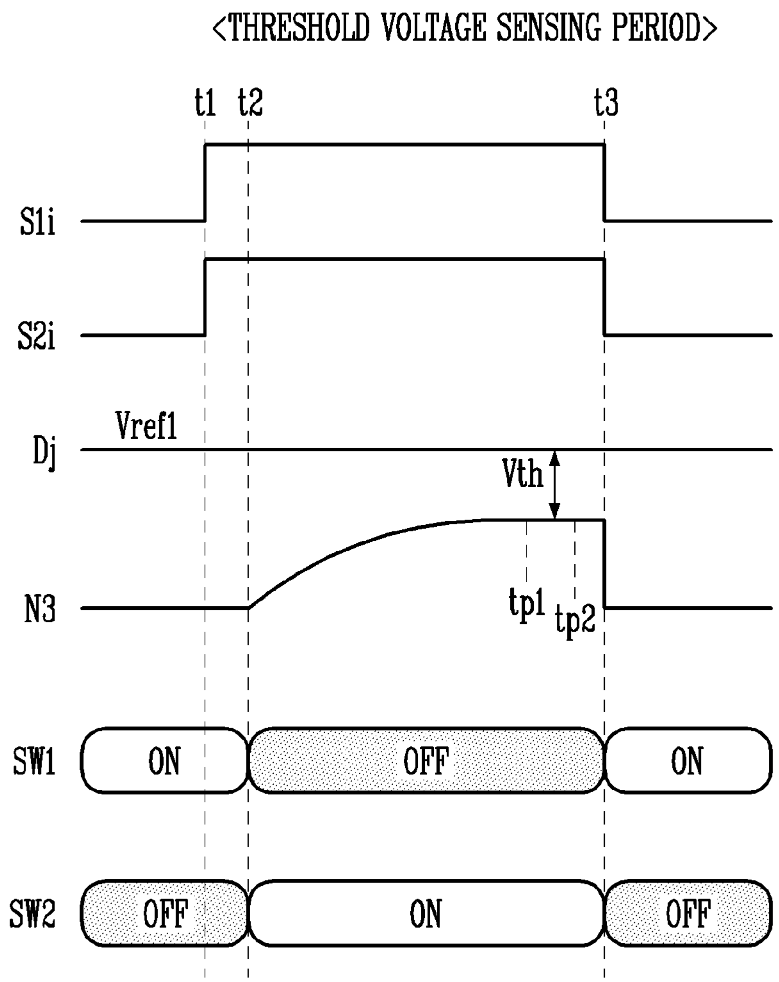
FIG. 9 is a diagram illustrating an embodiment of a sensing period according to the disclosure.
Figure 10:
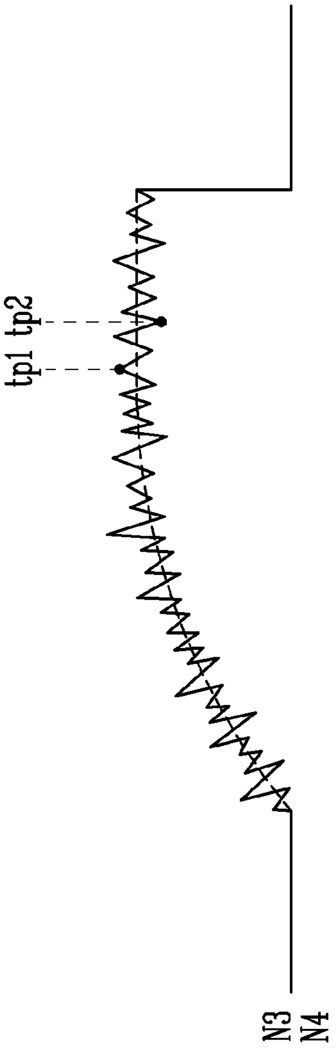
FIG. 10 is a diagram illustrating a sensing voltage due to the ripple of the first power.

FIG. 9 is a diagram illustrating an embodiment of a sensing period according to the disclosure. FIG. 10 is a diagram illustrating the sensing voltage due to the ripple of the first power.

When describing FIG. 9, a portion overlapping FIG. 4 is briefly described.

Referring to FIG. 9, the voltage of the first reference power Vref1 is supplied to the data line Dj during the sensing period. During the period between the first time point t1 and the third time point t3, the first scan signal is supplied to the first scan line S1*i* and the second scan signal is supplied to the second scan line S2*i*.

The second transistor T2 (refer to FIG. 2) is turned on during the period between the first time point t1 and the third time point t3 when the first scan signal is supplied to the first scan line S1*i*. The third transistor T3 (refer to FIG. 2) is turned on during the period between the first time point t1 and the third time point t3 when the second scan signal is supplied to the second scan line S2*i*.

At the first time point t1, the first switch SW1 is turned on, and the second switch SW2 maintains a turn-off state. When the first switch SW1 is turned on, the voltage of the initialization power Vint is supplied to the second node N2 (refer to FIG. 2) via the third node N3, the sensing line Ik, and the third transistor T3. Then, a voltage corresponding to a voltage difference between the first reference power Vref1 and the initialization power Vint is stored in the storage capacitor Cst.

At the second time point t2, the first switch SW1 is turned off, and the second switch SW2 is turned on. When the second switch SW2 is turned on, the third node N3 and the fourth node N4 are electrically connected. When the first switch SW1 is turned off, the voltage of the initialization power Vint is not supplied to the third node N3 (or the sensing line Ik).

After the second time point t2, voltages of the second node N2 and the third node N3 may increase to a sensing voltage obtained by subtracting the threshold voltage of the first transistor T1 from the voltage of the first reference power Vref1 in correspondence with the current amount supplied from the first transistor T1. At this time, since the second switch SW2 is set to a turn-on state, the third node N3 and the fourth node N4 are electrically connected, and thus the sensing voltage is stored in the sensing capacitor Css.

After the sensing voltage is stored in the sensing capacitor Css, the ADC 152 may change the sensing voltage to the digital data Ddata and supply the digital data Ddata to the sensing data generator 154 at the first sensing time tp1. In addition, the ADC 152 may change the sensing voltage to the digital data Ddata and supply the digital data Ddata to the sensing data generator 154 at a second sensing time tp2 different from the first sensing time tp1.

Additionally, in FIG. 9, the digital data Ddata is generated at the two sensing time points tp1 and tp2, but the disclosure is not limited thereto. In an embodiment, after the sensing voltage is stored in the sensing capacitor Css, the digital data Ddata may be generated at three or more different sensing times, for example.

Referring to FIG. 10, a voltage value of the sensing voltage applied from the third node N3 to the fourth node N4 may be fluctuated by the ripple of the first power VDD (e.g., the voltage value may be changed upward and downward based on a constant voltage).

In an embodiment of the disclosure, in order to minimize the influence of the sensing voltage due to the ripple of the first power VDD (refer to FIG. 5), the digital data Ddata may be generated two or more different sensing time points after the sensing voltage is stored in the sensing capacitor Css.

The two or more digital data Ddata generated from the same pixel during one sensing period may be stored in the storage 1541 (refer to FIG. 7) under the control of the controller 1542 (refer to FIG. 7). In addition, the controller 1542 may supply the two or more digital data Ddata generated from the same pixel to the generator 1543 (refer to FIG. 7). The generator 1543 may generate the sensing data Sdata using the two or more digital data Ddata supplied thereto, and may supply the sensing data Sdata to the timing controller 11 (refer to FIG. 1).

In the embodiment of FIG. 9, a plurality of digital data Ddata may be generated from the same pixel during one sensing period, and thus a time for generating the sensing data Sdata may be shortened.

In the above description, the threshold voltage of the first transistor T1 is sensed during the sensing period, but the disclosure is not limited thereto. That is, the embodiment of the disclosure may be variously applied in a case where the sensing period is included.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A display device comprising:
- pixels each including a driving transistor and a light-emitting element;
- a sensing unit which receives a sensing voltage corresponding to a characteristic of a driving transistor from a predetermined pixel which is singular among the pixels during a sensing period, generates a digital data in response to the sensing voltage, and generates sensing data using the digital data; and
- a timing controller which receives input data from an outside of the display device, corrects the input data using the sensing data and generates output data,
- wherein the sensing unit generates one sensing data using two or more digital data corresponding to the predetermined pixel, and
- wherein the sensing unit generates an average value or an intermediate value of the two or more digital data corresponding to the predetermined pixel as the sensing data.

2. The display device according to claim 1, wherein the sensing unit generates one digital data corresponding to the predetermined pixel during the sensing period.

3. The display device according to claim 1, wherein the sensing unit generates the two or more digital data corresponding to the predetermined pixel during the sensing period.

4. The display device according to claim 3, wherein the sensing unit generates the two or more digital data while sensing the sensing voltage corresponding to the predetermined pixel at different time points.

5. The display device according to claim 1, wherein the sensing unit comprises:
- a storage which stores the digital data;
- a controller which controls the storage; and
- a generator which generates the sensing data using the two or more digital data corresponding to the predetermined pixel.

6. The display device according to claim 5, wherein the controller supplies the two or more digital data to the generator when the two or more digital data corresponding to the predetermined pixel are stored in the storage.

7. The display device according to claim 1, further comprising:
- a data driver which generates a data signal using the output data and supplies the data signal to the predetermined pixel.

8. A method of driving a display device, the method comprising:
- receiving a sensing voltage from a driving transistor included in a predetermined pixel which is singular among pixels during a sensing period;
- converting the sensing voltage of the predetermined pixel into digital data;
- generating sensing data using two or more digital data in a sensing unit after the two or more digital data are supplied from the predetermined pixel; and
- generating output data by correcting input data input from an outside of the display device using the sensing data,
- wherein the sensing unit generates an average value or an intermediate value of the two or more digital data corresponding to the predetermined pixel as the sensing data.

9. The method according to claim 8, wherein one digital data is generated in correspondence with the predetermined pixel during the sensing period.

10. The method according to claim 8, wherein the two or more digital data are generated in correspondence with the predetermined pixel during the sensing period.

11. The method according to claim 10, wherein the two or more digital data are generated while sensing the sensing voltage of the predetermined pixel at different time points.

12. The method according to claim 8, further comprising: storing the digital data.

13. The method according to claim 8, further comprising: generating a data signal using the output data; and supplying the data signal to the predetermined pixel.

* * * * *